United States Patent
Sankarasubramanian et al.

(10) Patent No.: US 12,119,527 B2
(45) Date of Patent: Oct. 15, 2024

(54) REDOX FLOW BATTERY

(71) Applicant: Washington University, St. Louis, MO (US)

(72) Inventors: Shrihari Sankarasubramanian, St. Louis, MO (US); Vijay K. Ramani, St. Louis, MO (US)

(73) Assignee: Washington University, St. Louis, MO (US)

( * ) Notice: Subject to any disclaimer, the term of this patent is extended or adjusted under 35 U.S.C. 154(b) by 89 days.

(21) Appl. No.: 17/521,046

(22) Filed: Nov. 8, 2021

(65) Prior Publication Data

US 2022/0059860 A1 Feb. 24, 2022

Related U.S. Application Data

(63) Continuation of application No. 16/299,693, filed on Mar. 12, 2019, now Pat. No. 11,177,497.

(60) Provisional application No. 62/641,781, filed on Mar. 12, 2018.

(51) Int. Cl.
| | |
|---|---|
| *H01M 8/08* | (2016.01) |
| *H01M 8/04791* | (2016.01) |
| *H01M 8/083* | (2016.01) |
| *H01M 8/1004* | (2016.01) |
| *H01M 8/18* | (2006.01) |

(52) U.S. Cl.
CPC ......... *H01M 8/188* (2013.01); *H01M 8/0482* (2013.01); *H01M 8/083* (2013.01); *H01M 8/1004* (2013.01); *H01M 2300/0011* (2013.01)

(58) Field of Classification Search
None
See application file for complete search history.

(56) References Cited

U.S. PATENT DOCUMENTS

| | | | |
|---|---|---|---|
| 3,996,064 A | 12/1976 | Thaller | |
| 8,641,949 B2 | 2/2014 | Yan et al. | |
| 11,177,497 B2* | 11/2021 | Sankarasubramanian | ................... H01M 8/083 |
| 2001/0028977 A1* | 10/2001 | Kazacos | ................. H01M 8/20 429/188 |
| 2004/0202925 A1 | 10/2004 | Clarke et al. | |
| 2010/0047671 A1* | 2/2010 | Chiang | ................. H01M 8/188 429/246 |

(Continued)

FOREIGN PATENT DOCUMENTS

| | | | |
|---|---|---|---|
| WO | WO2004095602 | * | 11/2004 |
| WO | WO2019137696 | * | 7/2019 |

OTHER PUBLICATIONS

Parrando et al. ECT Transactions 58 (37) 55-64 (2014) (Year: 2014).*

(Continued)

*Primary Examiner* — Lisa S Park
(74) *Attorney, Agent, or Firm* — Armstrong Teasdale LLP

(57) ABSTRACT

Disclosed herein is a redox flow battery (RFB). The battery generally includes: a positive electrolyte that is a first metal ion, a negative electrolyte that is a second metal ion, an ion exchange membrane positioned between the positive electrolyte and the negative electrolyte. The membrane is configured to restrict and/or prevent the passage of the first metal ion and/or the second metal ion therethrough, and is configured to maintain ionic conductivity between the positive electrolyte and the negative electrolyte.

15 Claims, 9 Drawing Sheets

(56) References Cited

U.S. PATENT DOCUMENTS

| | | |
|---|---|---|
| 2010/0266928 A1 | 10/2010 | Fukuta et al. |
| 2013/0224550 A1 | 8/2013 | Bugga et al. |
| 2014/0028260 A1 | 1/2014 | Goeltz et al. |
| 2015/0017494 A1* | 1/2015 | Amstutz ............... H01M 8/20 |
| | | 429/70 |
| 2016/0013506 A1 | 1/2016 | Dong et al. |
| 2016/0322662 A1 | 11/2016 | Schmitz et al. |
| 2017/0047593 A1 | 2/2017 | Lu et al. |
| 2017/0054160 A1 | 2/2017 | Tarrant |
| 2017/0298252 A1 | 10/2017 | Arnepalli et al. |

OTHER PUBLICATIONS

Gernon, M. D. et al. Environmental benefits of methanesulfonic acid: Comparative properties and advantages. Green Chem., 1999, 1(3):127-140.

Sankarasubramanian, S. et al., "Methanesulfonic acid-based electrode-decoupled vanadium-cerium redox flow battery exhibits significantly improved capacity and cycle life," Sustainable Energy Fuels, 3: 2417-2425 (2019).

Soloveichik, G. L. Flow Batteries: Current Status and Trends. Chem. Rev. 2015, 115(20):11533-11558.

Wang, W. et al. A new redox flow battery using Fe/V redox couples in chloride supporting electrolyte. Energy Environ. Sci., 2011, 4(10):4068-4073.

* cited by examiner

REDOX FLOW BATTERY

CROSS-REFERENCE TO RELATED APPLICATIONS

This application is a continuation application of U.S. patent Ser. No. 16/299,693 filed Mar. 12, 2019, which claims the benefit of priority to U.S. Provisional Application No. 62/641,781 filed Mar. 12, 2018, the contents of which are hereby incorporated by reference in their entireties.

ACKNOWLEDGEMENT OF GOVERNMENT SUPPORT

This invention was made with government support under DE-AR0000768 awarded by the U.S. Department of Energy. The government has certain rights in the invention.

BACKGROUND

The field of the disclosure relates generally to electrochemical cells and, more specifically, to an electrode-decoupled redox flow battery that utilizes a unique combination of active species.

Redox flow batteries (RFBs) are a promising technology for large scale energy storage due to the inherent decoupling of energy and power in the RFBs. For example, energy is stored and released by suitably changing the oxidation state of ions in solution (i.e., the electrolytes). As the electrolytes are pumped in from external reservoirs, the energy obtained from a given RFB cell or stack is a function of the reservoir size. The voltage of the stack is a function of the number of individual cells connected in series, and is a function of the difference in equilibrium potential between the active species. Unlike batteries with solid electrodes, since increasing the energy stored in a RFB does not require any changes in battery size or structure, there is no impact on the current, and hence on the power output, of a RFB (i.e., decoupling of energy and power). This also has important cost implications relative to lithium ion batteries, because potentially doubling the capacity of a RFB only requires a doubling of the reservoir size and not duplication of the entire battery stack, which can be an expensive endeavor.

SUMMARY

In one aspect, disclosed herein is a redox flow battery (RFB). The battery generally comprises: a positive electrolyte comprising a first metal ion, a negative electrolyte comprising a second metal ion, an ion exchange membrane positioned between the positive electrolyte and the negative electrolyte, wherein said membrane is configured to restrict and/or prevent the passage of the first metal ion and/or the second metal ion therethrough, and said membrane is configured to maintain ionic conductivity between the positive electrolyte and the negative electrolyte.

In another aspect, disclosed herein is a method for storing electricity. The method generally comprises preparing a positive electrolyte that comprises a first metal ion; preparing a negative electrolyte that comprises a second metal ion; placing an ion exchange membrane between the positive electrolyte and the negative electrolyte, wherein said membrane is configured to restrict and/or prevent the passage of the first metal ion and/or the second metal ion therethrough, and said membrane is configured to maintain ionic conductivity between the positive electrolyte and the negative electrolyte. In some aspects, the method for storing electricity generally comprises preparing the redox flow battery as described elsewhere herein.

In another aspect, disclosed herein is a method for generating an electrical current. The method generally comprises: preparing a redox flow battery, and flowing the positive electrolyte and the negative electrolyte at a flow rate along a surface of the ion exchange membrane thereby generating an electrical current; wherein the redox flow battery comprises: a positive electrolyte comprising a first metal ion, a negative electrolyte comprising a second metal ion, an ion exchange membrane positioned between the positive electrolyte and the negative electrolyte, wherein said membrane is configured to restrict and/or prevent the passage of the first metal ion and/or the second metal ion therethrough, and said membrane is configured to maintain ionic conductivity between the positive electrolyte and the negative electrolyte. In some aspects, the redox flow battery as described elsewhere herein.

BRIEF DESCRIPTION OF THE DRAWINGS

The following drawings illustrate various aspects of the disclosure.

DETAILED DESCRIPTION

Figure 1A:
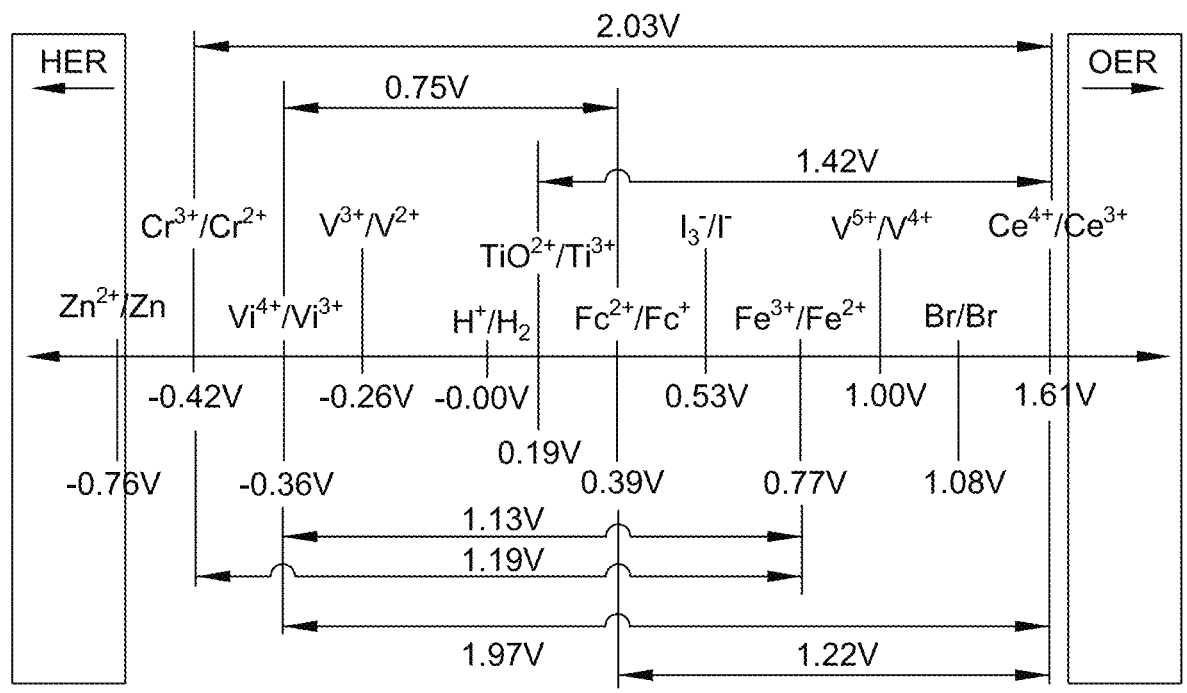
FIG. 1A illustrates potential combinations of actives for an example electrode-decoupled RFB.

The systems and methods described herein relate to a redox flow battery (RFB) with a positive electrolyte including dissolved cerium ions and the negative electrolyte including dissolved titanium ions, with both electrolytes sharing a common anion. The electrolytes are separated by an anion exchange membrane (AEM) that prevents, or at least partially restricts, the crossover of the Ti or Ce ions while maintaining ionic conductivity by the free passage of suitable anions, such as sulfate ($SO_4^{2-}$) or methanesulfonate ($CH_3SO_3^-$). In many aspects, this results in an RFB which is stable for multiple charge and discharge cycles at different currents and voltages. In one non-limiting example, this results in an RFB with a 1.2V discharge voltage, 300 mW/cm² power density at this voltage, and capacity and coulombic efficiencies that are essentially 100% over 25 cycles.

The RFB's use of earth abundant elements, as described herein, allows the RFBs to realize costs significantly lower than that of Li-ion batteries, and the construction of electrode-decoupled RFBs is a key step in this direction. If different cations can be used at the positive and negative electrodes, this would open up the design space in terms of the usable chemistries and allow for tailored RFB chemistries. The key challenge here is the need to separate cations while allowing for the free movement of anions. In one embodiment, the AEMs described herein have been found to demonstrate an ability to achieve this ion-selective separation process. There are also several AEMs proposed or in the market that would be suitable for use in the RFB to varying degrees. Example AEMs include, but are not limited to, those listed in U.S. Pat. No. 8,641,949. Thus, several AEMs can be used to make the RFB.

Electrode-decoupled RFBs are hampered by the need to separate the cations. This issue was faced by NASA when they first tested the Fe—Cr RFB (L. H. Thaller, U.S. Pat. No. 3,996,064, 1976 and reports cited therein). A Fe—V system proposed by PNNL (Energy Environ. Sci., 2011, 4, 4068) also suffers from the same issue which they circumvent by using a mixed cation electrolyte, which has a significant impact on the performance of the RFB. Others have proposed V—Br, Br—S, Zn—Br, V—Ce, Fe—Br, Mn—Br, Ti—Mn, Fe—Ti systems. An extensive review of RFBs with both elemental and non-elemental actives may be found in Chem. Rev. 2015, 115, 11533-11558. Described herein is an RFB that overcomes and resolves many of the difficulties previously found in these systems. Thus, in one aspect, a Ti—Ce electrode-decoupled RFB is described herein. The following sections describe the electrolyte selection process, the specific economics of the Ti—Ce electrolytes compared to some common combinations in various stages of commercialization, and finally the RFB system and its performance.

In one aspect, disclosed herein is a redox flow battery. The (RFB) generally comprises: a positive electrolyte comprising a first metal ion, a negative electrolyte comprising a second metal ion, an ion exchange membrane positioned between the positive electrolyte and the negative electrolyte, wherein said membrane is configured to restrict and/or prevent the passage of the first metal ion and/or the second metal ion therethrough, and said membrane is configured to maintain ionic conductivity between the positive electrolyte and the negative electrolyte.

In some aspects, the first metal ion and the second metal ion are each independently selected from the group consisting of alkali metals, alkali earth metals, transition metals, lanthanide metals, actinide metals and combinations thereof. In some aspects, the first metal ion is an alkali metal. In some aspects, the first metal ion is an alkali earth metal. In some aspects, the first metal ion is a transition metal. In some aspects the first metal ion is a lanthanide metal. In some aspects, the first metal ion is an actinide metal. In some aspects, the first metal ion is a combination of two or more different metal ions.

In some aspects, the second metal ion is an alkali metal. In some aspects, the second metal ion is an alkali earth metal. In some aspects, the second metal ion is a transition metal. In some aspects the second metal ion is a lanthanide metal. In some aspects, the second metal ion is an actinide metal. In some aspects, the second metal ion is a combination of two or more different metal ions. In some aspects, the first metal and the second metal pairs are selected from the group consisting of V/Ce, Ti/Ce, Fe/Ce, Cr/Ce, Cr/Ti, Zn/Ti, Ti/Br, and Ti/Fe.

In some aspects, the first metal ion is $Ti^{2+}$ or the second metal is $Ce^{4+}$ as illustrated in the following two reduction potential reactions:

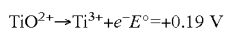

$$TiO^{2+} \rightarrow Ti^{3+} + e^-\ E^\circ = +0.19\ V$$

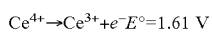

$$Ce^{4+} \rightarrow Ce^{3+} + e^-\ E^\circ = 1.61\ V$$

In some aspects, when the first metal ion is $Ti^{2+}$, any metal having a reduction potential less than or equal to that of $Ce^{4+}$ may be used on the negative side of the battery. In some aspects, when the second metal ion is $Ce^{4+}$, any metal having a reduction potential greater than or equal to that of $Ti^{2+}$ may be used on the positive side of the battery.

In another aspect, the metal used in combination with either the first and/or the second metal will have at least one of the following properties: no phase change occurs during the redox reaction with the other metal, no side reactions or decomposition reactions occur during the redox reaction with the other metal, the metal is compatible with an acidic supporting electrolyte, and the ΔE will be at least 0.5 V. In some aspects, the metal used with either the first and/or the second metal will have two or more of these properties. In some aspects, the metal used with either the first and/or the second metal will have three or more of these properties. In some aspects, the metal used with either the first and/or the second metal will have all four of these properties. For example, the first metal is selected (e.g., titanium), and the second metal is selected such that it exhibits one or more of the above listed properties. In another non-limiting example, the second metal is selected (e.g., cerium), and the first metal is selected such that it exhibits one or more of the above listed properties.

Figure 2A:
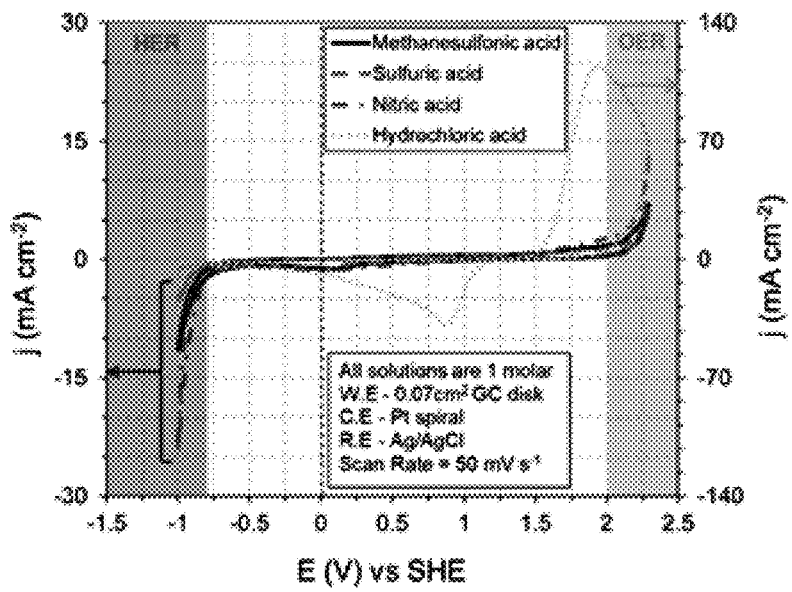
FIG. 2A illustrates voltage stability windows of common aqueous RFB supporting electrolytes.

In some aspects, the first electrolyte and the second electrolyte have at least one ion in common. In some aspects, the first electrolyte and the second electrolyte have at least one anion in common. In some aspects, the first electrolyte and/or the second electrolyte is an acid. Acid selection is done as described elsewhere herein, but in all cases the acid must be electrochemically stable. As used herein, "electrochemically stables" means that a 1 M solution of the acid does not undergo a decomposition reaction at a voltage below 1.5V relative to a standard hydrogen electrode. In some aspects, the acid is stable at a voltage below 2.0V. For example, as illustrated in FIG. 2A, hydrochloric acid exhibits a decomposition peak at about 1.5V in the cyclic voltammogram.

In some aspects, at least one of the electrolyte solutions is an acid. In some aspects, both electrolyte solutions are acids. The acids may be the same or different. In some aspects, the acid is selected from the group consisting of sulfuric acid, methanesulfonic acid, triflic acid, benzene sulfonic acid, trifluoroacetic acid, and combinations thereof. In some aspects, the acid is methanesulfonic acid. In some aspects, the acid is sulfuric acid. In some aspects, the acid is a mixture of methanesulfonic acid and sulfuric acid. For a mixture of two acids, the ratio of the two acids is from 1:99 to 99:1 and all increments in between.

As illustrated in the examples, strong acids are effective in the redox flow battery described herein. In some aspects, the pKa of the acid is below about 2.0. In some aspects, the pKa of the acid is below about 1.0. In some aspects, the pKa of the acid is below about 0. In some aspects, the pKa of the acid is below about −2.0.

Another part of the RFB is the membrane that separates the first electrolyte solution and the second electrolyte solution. The exact composition of the membrane is less important than its specific capabilities. In some aspects, the membrane is an ion exchange membrane that allows the passage of one type of ion while restricting or preventing the passage of another type of ion. For example, in some aspects, the membrane allows the passage of an anion from one chamber of the battery to the other, while it also restricts and/or prevents the passage of the cations from one chamber of the battery to the other. Additionally, the membrane is stable during operation of the RFB and does not decompose or react under the flow of the electrical current in the system.

Also disclosed herein is a method for generating an electrical current. The method generally comprises preparing the redox flow battery as described elsewhere herein and flowing the positive electrolyte and the negative electrolyte at a flow rate along a surface of the ion exchange membrane thereby generating an electrical current.

In still yet another aspect, disclosed herein is a method for storing electricity. The method generally comprises preparing a positive electrolyte that comprises a first metal ion; preparing a negative electrolyte that comprises a second metal ion; placing an ion exchange membrane between the positive electrolyte and the negative electrolyte, wherein said membrane is configured to restrict and/or prevent the passage of the first metal ion and/or the second metal ion therethrough, and said membrane is configured to maintain ionic conductivity between the positive electrolyte and the negative electrolyte. In some aspects, the method for storing electricity generally comprises preparing the redox flow battery as described elsewhere herein.

EXAMPLES

Design Space for Electrochemical Actives in Aqueous Media

FIG. 1A illustrates potential combinations of actives for an example electrode-decoupled RFB. Most of the actives considered are elemental actives due to the ease of availability and lack of any costly synthesis steps prior to operation. The design space in aqueous systems is constrained due to several factors including, but not necessarily limited to, a) the hydrogen evolution reaction (HER) and the oxygen evolution reaction (OER), b) pH range for a given redox species and its compatibility in a proposed pair, c) possible side reactions with salt or supporting electrolyte anions, d) differences in solubility between oxidation states of a given active, and/or e) changes in pH over the course of cycling. Further, any chosen active is selected based on the DOE-ARPA-E cost target of $100/KWh. As such, the following selection criteria has been established.

For example, RFB actives are chosen that would result in a) no H2 evolution; b) no $O_2$ evolution; c) near or greater than 1V cell; d) no plating processes on either electrode; and/or e) that are preferably benign (non-toxic, no side reactions).

Electrolyte Composition

The solution composition plan was determined experimentally by cyclic voltammetry of the actives and supporting electrolytes in a small volume electrochemical cell from Pine. A 0.07 cm² polished glassy carbon disk was used for all the measurements and was paired with a Pt spiral counter electrode and a Ag/AgCl reference electrode.

Referring to FIG. 2A, the most common acids were tested for their electrochemical stability in the aqueous active window and it was determined that for any positive electrolyte with a standard potential close to or above 1V vs SHE, HCl is not a suitable supporting electrolyte due to chlorine evolution (e.g., notice the peak at 1.5V).

This problem is further compounded when an active with a very positive standard electrode potential such as cerium is to be used. Cerium undergoes the following reaction with the free chloride ions in solution:

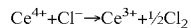
$$Ce^{4+}+Cl^-\rightarrow Ce^{3+}+\tfrac{1}{2}Cl_2$$

This evolution of chlorine would lead to problems with the charging step of a RFB incorporating this active, with the charging cycle being driven by chlorine evolution and the "chemical" discharge of the Ce active. A similar reaction is also possible in the presence of $NO_3^-$ ions. In the presence of $NO_3^-$ ions, a very positive standard electrode potential for an active would lead to evolution of $NO_2$. The representative reaction in the case of cerium is as follows:

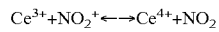
$$Ce^{3+}+NO_2^+\leftarrow\rightarrow Ce^{4+}+NO_2$$

This is further compounded by the fact that an equilibrium exists between $NO_3^-$ and $NO_2$ with a standard potential around 0.8V vs. SHE, and the representative reaction being:

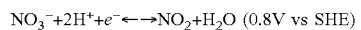
$$NO_3^-+2H^++e^-\leftarrow\rightarrow NO_2+H_2O\ (0.8V\ vs\ SHE)$$

This issue also precludes the use of $HNO_3$.

Figure 2B:
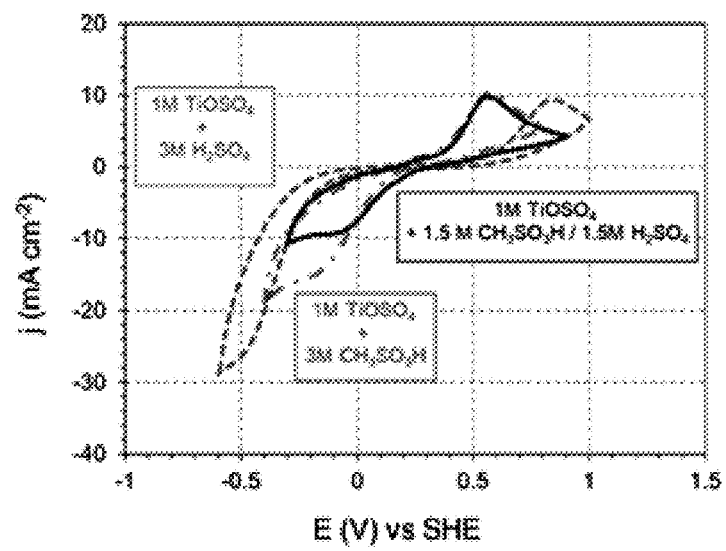
FIG. 2B illustrates cyclic voltammograms of $TiOSO_4$ dissolved in acidic supporting electrolytes.
Figure 2C:
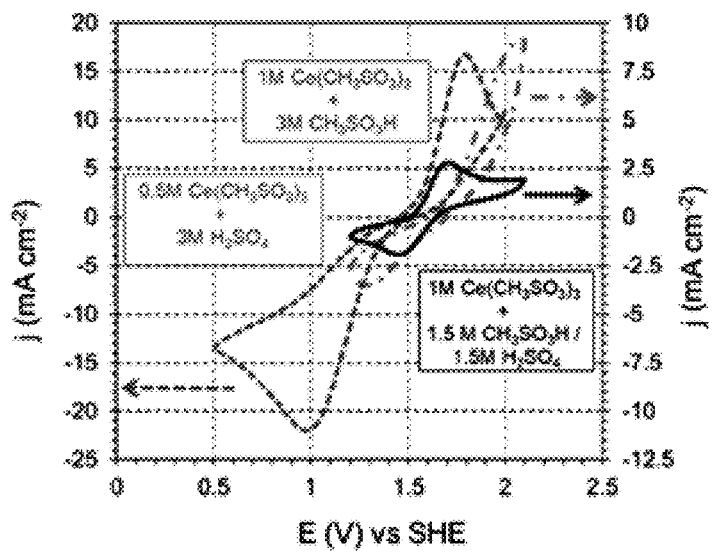
FIG. 2C illustrates cyclic voltammograms of $Ce(SO_4)_2$ dissolved in acidic supporting electrolytes.

Between $CH_3SO_3H$ and $H_2S_4$, while $H_2SO_4$ is not an inherently prone to any undesirable side reactions, most sulfate salts of interest are poorly soluble and hence would not allow us to achieve>=1M concentration of actives. A 0.5M Ti—Ce cell using the sulfate anion has been demonstrated in the tests that follow. A road map has also been determined to develop methanesulfonate analogues following the synthesis procedures for methanesulfonate salts outlined in *Green Chem.*, 1999, 1, 127-140. FIGS. 2B and 2C show electrochemical data for Ti and Ce salts dissolved in methanesulfonic acid, sulfuric acid and a combination thereof. Thus, the electrolytes are producible, and they may be used in Ti—Ce cells.

Solubility of Cerium Ions

Mixtures of methanesulfonic acid and sulfuric acid were examined to determine the solubility of both $Ce^{3+}$ and $Ce^{4+}$ in them. The inverse solubility relation between these oxidation states means that the both have to be separately measured (see Table 1).

TABLE 1

Solubility of cerium ions

| $CH_3SO_3H$ concentration | $H_2SO_4$ concentration | $Ce^{3+}$ solubility | $Ce^{4+}$ solubility |
|---|---|---|---|
| 4M | 0M | 0.9M | 0.9M |
| 3M | 0.25M | 0.9M | 0.5M |
| 2M | 0.5M | 0.8M | 0.2M |
| 1M | 0.75M | 0.7M | insoluble |
| 0M | 1M | 0.5M | 0.5M |

The $Ce^{3+}$ salts have an inverse solubility relationship with acid concentration with both $CH_3SO_3H$ and $H_2SO_4$ and hence are largely unaffected by the mixing of the supporting electrolytes. $Ce^{4+}$ on the other hand is more soluble at higher acid concentrations. Additional combinations include the use of acetic acid, formic acid, citric acid, phosphoric acid, perchloric acid, trifluoromethanesulfonic acid and other organic or mineral acids by themselves or in combination. Because the maximum solubility of cerium is 1 M in the sulfuric acid, in some aspects, the cerium may be either supersaturated or colloidal in order to increase the amount of the metal in the system. In some aspects, the cerium solution is supersaturated with cerium. In some aspects, the cerium is colloidal. In some aspects, the concentration of the cerium is greater than 1 M. In some aspects, the concentration is 1.5 M or 2 M.

Redox Stability of Cerium

Figure 1B:
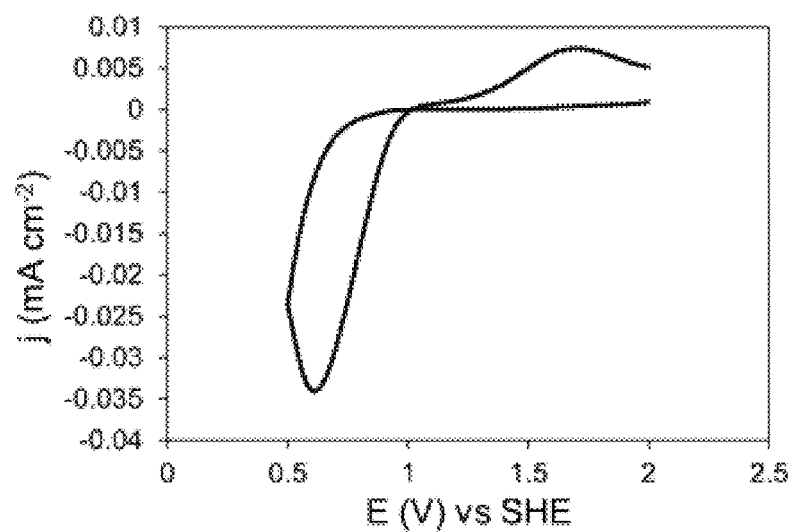
FIG. 1B illustrates the cyclic voltammogram of 1M $(NH_4)_2Ce(NO_3)_6$ in 1M $HNO_3$.

Ceric ammonium nitrate was found to be soluble up to 1.5 M in DI water and a 1 M solution with 1 M $HNO_3$ supporting electrolyte was found to be redox active without apparent signs of oxygen evolution or precipitation of salts of either oxidation state (see FIG. 1B).

Stabilizing Supersaturated $Ce^{3+}$ and $Ce^{4+}$ Solutions

The $Ce^{3+}$ salts have an inverse solubility relationship with acid concentration with both $CH_3SO_3H$ and $H_2SO_4$ and hence are largely unaffected by the mixing of the supporting electrolytes. $Ce^{4+}$ on the other hand is more soluble at higher acid concentrations. Additional combinations include the use of acetic acid, formic acid, citric acid, phosphoric acid, perchloric acid, trifluoromethanesulfonic acid and other organic or mineral acids by themselves or in combination.

An inverse relationship exists between the solubilities of $Ce^{3+}$ and $Ce^{4+}$ with acid concentration ($Ce^{3+}$ solubility is inversely proportional to acid concentration while $Ce^{4+}$ solubility is directly proportional). This allows for the design of electrolytes where $Ce^{3+}$ or $Ce^{4+}$ is soluble up to the desired 2M level while precipitation of the other oxidation state is prevented using additives that stabilize supersaturated $Ce^{3+}$ or $Ce^{4+}$ solutions. In some aspects, organic and inorganic additives are included to stabilize the supersaturated solutions of both oxidation states. The organic additives include, but are not limited to, malic acid, sorbitol, urea, glucose, fructose, inositol, phytic acid, EDTA, and organic compounds with 2 or more secondary or tertiary —SH or —NH2 groups. The inorganic additives include, but are not limited to, phosphates, sulfates and methanesulfonates, such as, for example, potassium phosphate, sodium sulfate, sodium pentapolyphosphate. Other additives that solubilize the cerium ion are known in the art and included herein.

Ce Colloidal Electrolytes

In some aspects, the cerium electrolyte is colloidal. For this aspect, high concentration Ce electrolytes where either $Ce^{3+}$ salts or $Ce^{4+}$ salts are allowed to partially precipitate but are kept suspended either by mechanical (e.g., stirring, ultrasonic agitation) or chemical means (e.g., surfactants (such as polyacrylic acid (US 2017/0298252)) to prevent agglomeration and settling). Depending on the concentration, a portion or all of the suspended particles re-dissolve and participate in the redox process as the concentration of the dissolved species of a particular oxidation state drops over the course of the redox process.

In some aspects, additional additives are included in one or both of the electrolyte solutions. Additives, surfactants, and supporting electrolytes may be included as necessary as long as they do not interfere with the underlying redox chemistry. For example, a surfactant may be added to help solubilize the metal ions in an electrolyte solution. Stabilizers may be added in order to improve the long term stability of the electrolyte solutions.

Economics of the Ti—Ce System

Figure 3:
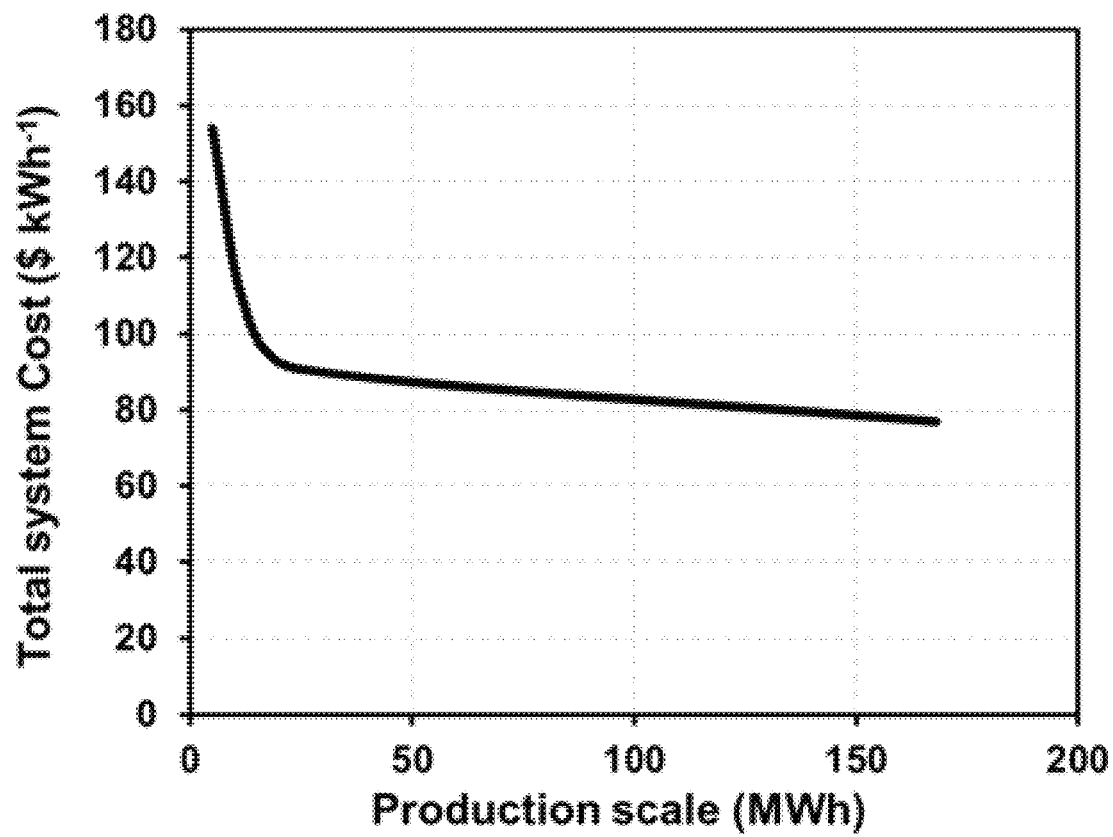
FIG. 3 illustrates the projected installed system cost of an electrode-decoupled Ti—Ce redox flow battery at different productions scales for a 1 MWh module.

Assuming that the balance of plant is the same for all RFB systems, the cost of the electrolytes was calculated on the basis of a 2 GW/10 GWh RFB with 80% efficiency. The costs of the salts were taken from commercial sources. Referring to FIG. 3, it can be seen that no comparable commercial, or near commercial RFB, exists that can match the combination of power density and cost presented by a Ti—Ce cell while also satisfying the RFB criteria described above. Ce—Cr would appear to satisfy the criteria outlined but suffer from the chlorine evolution based self-discharge mechanism as describe above.

Construction and Cycling of a Ti—Ce Electrode-Decoupled RFB

Figure 4:
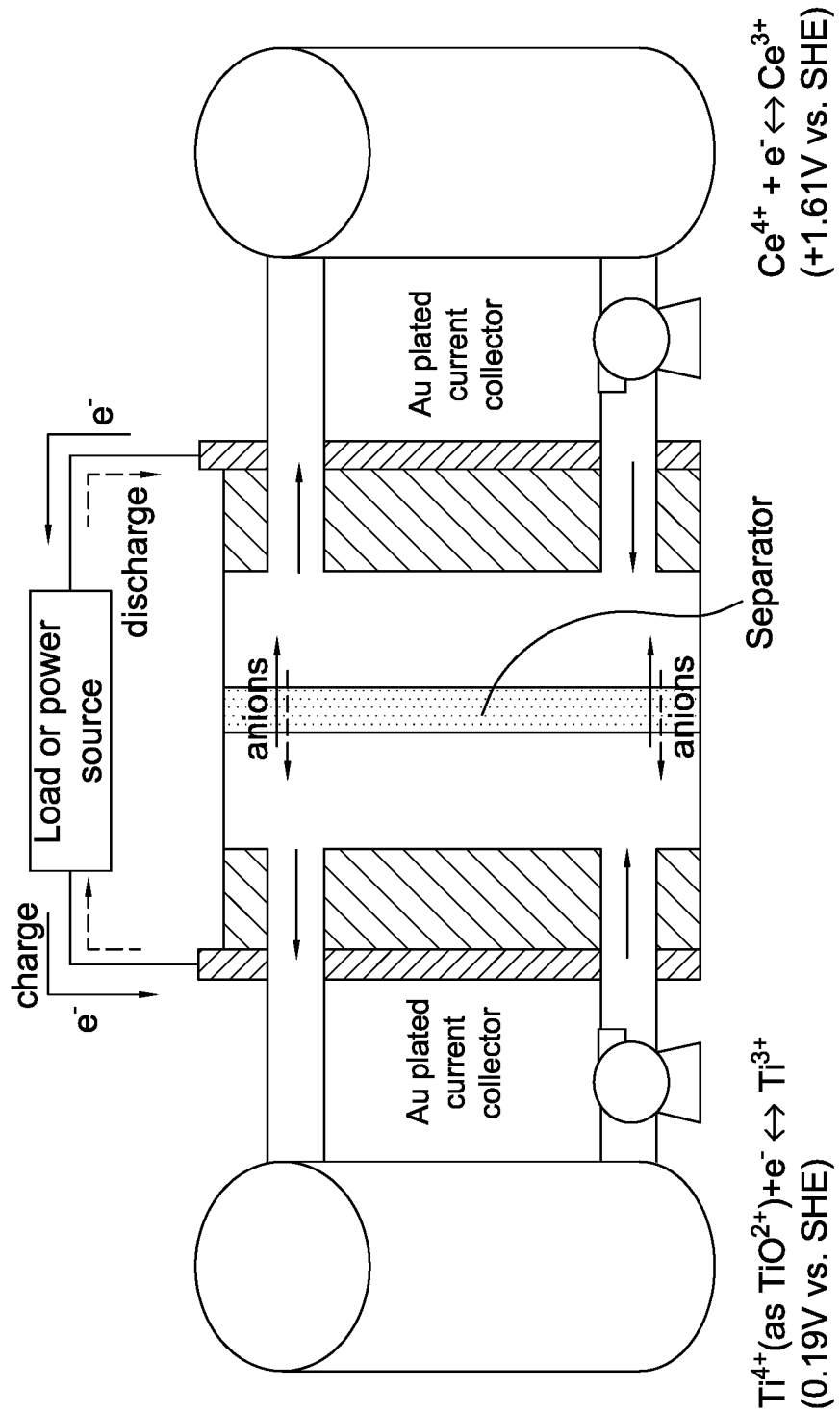
FIG. 4 is a schematic of one aspect of an electrode-decoupled titanium-cerium RFB.

The Ti—Ce RFB was assembled and cycled using a Scribner Inc., RFB test station. The electrolytes stored in external tanks were pumped using Cole-Parmer peristaltic pumps through the RFB where they were evenly distributed over a high surface area (e.g., 25 $cm^2$) with carbon felt through serpentine channels machined into the graphite plates. The electrolytes underwent redox processes when flowing through the carbon felt and the current required (or produced) was collected using gold plated copper current collectors. A schematic of the setup is shown in FIG. 4. The separator used was a quaternized Cardo-poly(etherketone) membrane prepared as described in ChemPlusChem 2015, 80, 412-421. Also shown in FIG. 4 is the electrically conductive porous electrodes. The electrolytes flow along the membrane but also through the porous electrode which is where the redox process occurs and electricity is generated. The membrane is ionically conductive while simultaneously being electrically insulating.

Figure 5:
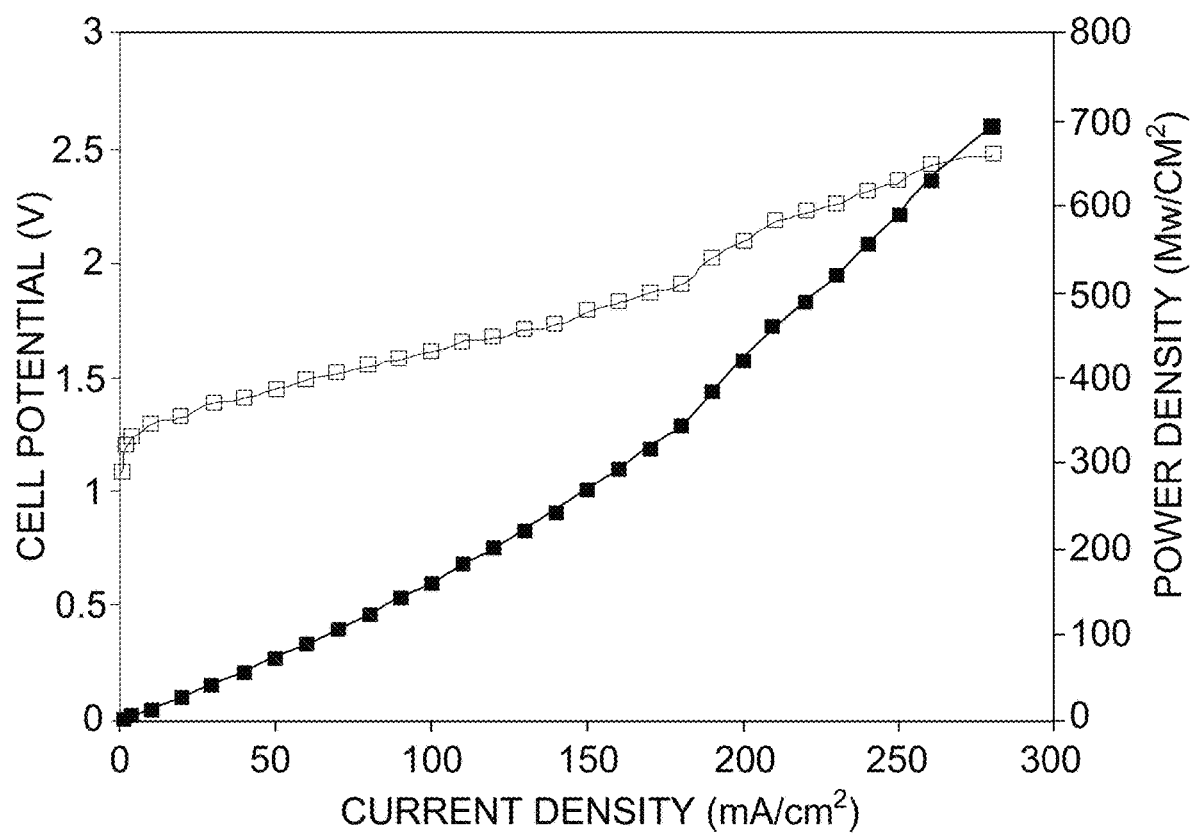
FIG. 5 illustrates a polarization curve of an electrode-decoupled Ti—Ce RFB with a quaternized Cardo-poly(etherketone) membrane, 0.5M $TiOSO_4$/3M $H_2SO_4$ negative electrolyte, 0.5M $Ce(SO_4)_2$/3M $H_2SO_4$ positive electrolyte at a flow rate of 100 mL/min.

Referring to FIG. 5, the performance of the RFB across a range of current densities was characterized by passing a set current through the RFB for 2 minutes and monitoring the voltage attained by the RFB. The product of these two variables allowed us to calculate the power density of the cell. It was observed that the RFB could attain a 700 $mW/cm^2$ at 2.5V. At potentials lower than the OER limit (~2V), the cell attained power densities>500 $mW/cm^2$ with the power density at the discharge voltage of 1.2V being~300 $mW/cm^2$.

Ti—Ce RFB Cell Cycling

Figure 6A:
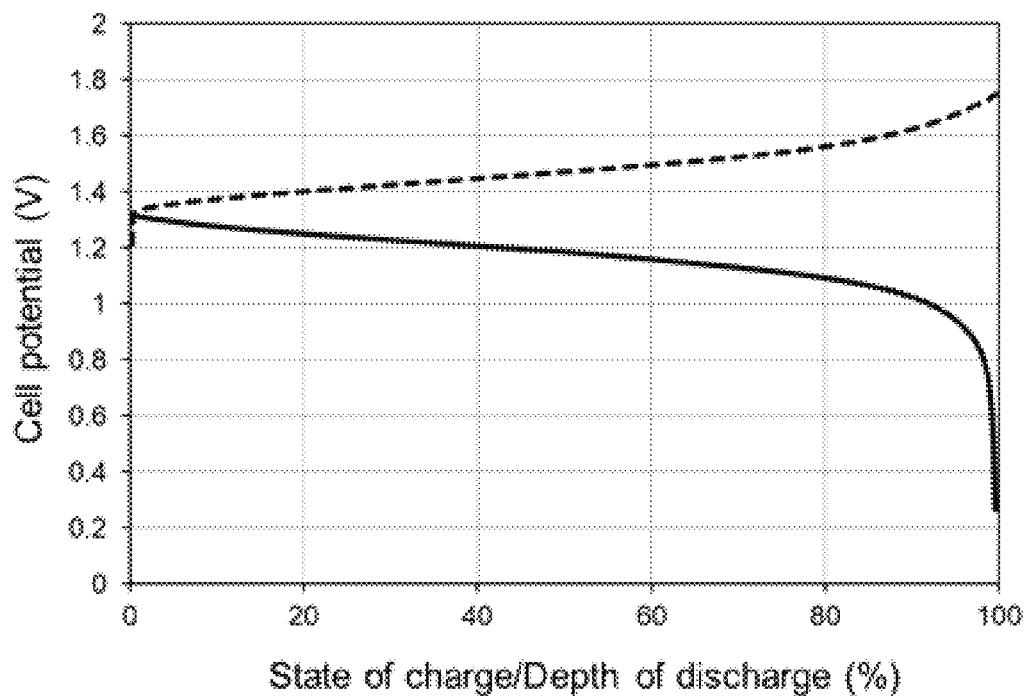
FIG. 6A illustrates a representative charge-discharge curve of an electrode-decoupled Ti—Ce RFB with a quaternized Cardo-poly(etherketone) membrane, 0.5M $TiOSO_4$/3M $H_2SO_4$ negative electrolyte, 0.5M $Ce(SO_4)_2$/3M $H_2SO_4$ positive electrolyte at a flow rate of 100 mL/min and a 0.5 A current.
Figure 6B:
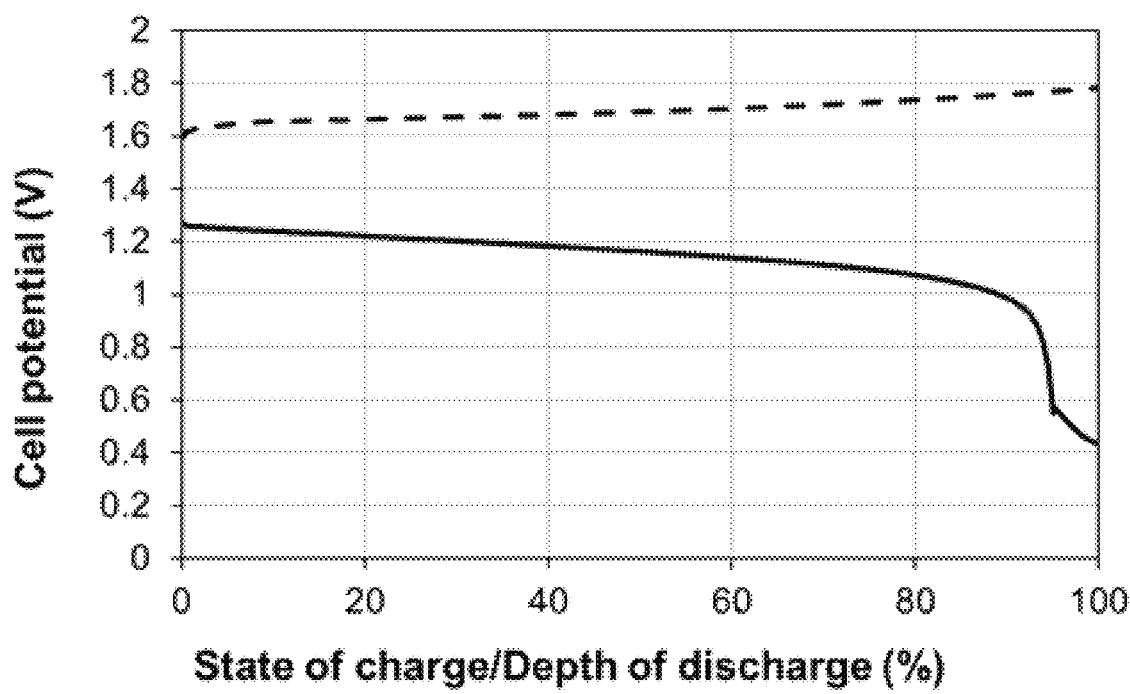
FIG. 6B illustrates the charge-discharge curve of an electrode-decoupled Ti—Ce RFB with a quaternized Cardo-poly(etherketone) membrane, 0.9M $TiOSO_4$/4M $CH_3SO_3H$ negative electrolyte, 0.9M $Ce(CH_3SO_3)_3$/4M $CH_3SO_3H$ positive electrolyte at a flow rate of 100 mL/min and a 0.5 A current.

Once the attainable performance of the cell was determined, the cycling performance was measured by charging and discharging the cell at a constant-current of 20 $mA/cm^2$. The voltage profiles are shown in FIGS. 6A and 6B. The difference between the theoretical open circuit voltage (OCV) of 1.42V (such as that shown in FIG. 1A) and the measured OCV of ~1.35V can be attributed to the iR losses due to the resistance of ~150 mV. The cell was found to have a relatively flat voltage profile with no plateaus indicative of phase changes and a discharge capacity of 8.3 Ah/L.

Figure 7A:
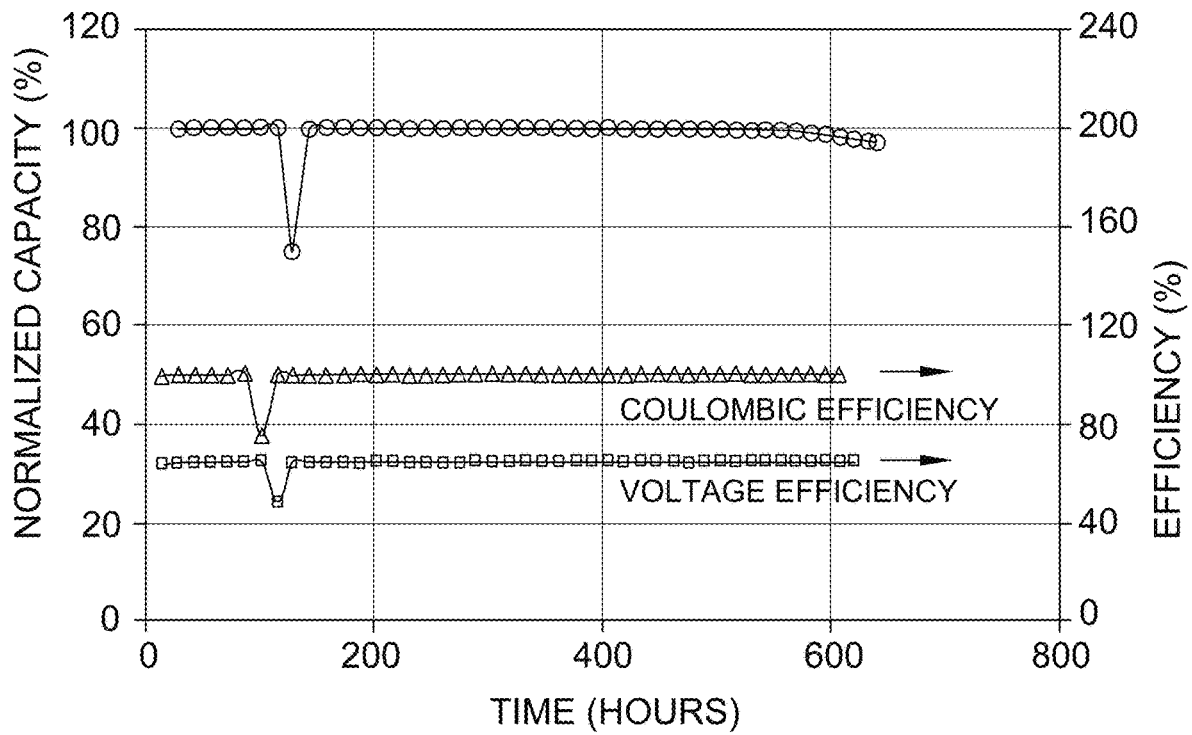
FIG. 7A illustrates the performance metrics of an electrode-decoupled Ti—Ce RFB with a quaternized Cardo-poly(etherketone) membrane, 0.5M $TiOSO_4$/3M $H_2SO_4$ negative electrolyte, 0.5M $Ce(SO_4)_2$/3M $H_2SO_4$ positive electrolyte at a flow rate of 100 mL/min and a 2.5 A current.
Figure 7B:
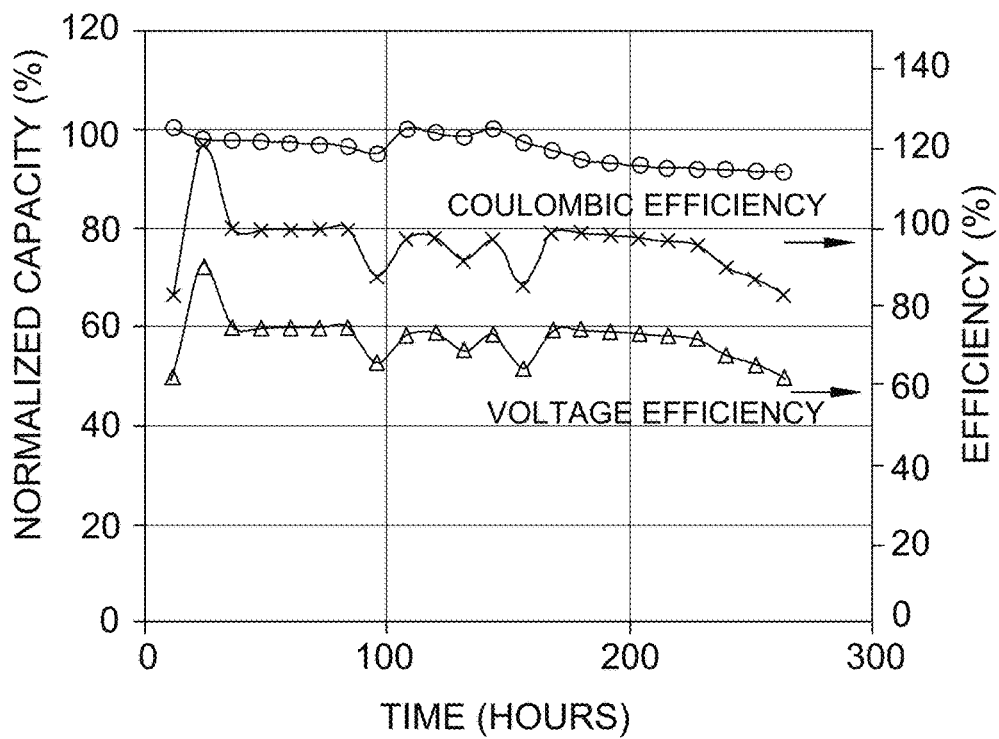
FIG. 7B illustrates the performance metrics of an electrode-decoupled Ti—Ce RFB with a quaternized Cardo-poly(etherketone) membrane, 0.9M $TiOSO_4$/4M $CH_3SO_3H$ negative electrolyte, 0.9M $Ce(CH_3SO_3)_3$/4M $CH_3SO_3H$ positive electrolyte at a flow rate of 100 mL/min and a 2.5 A current.
Figure 8:
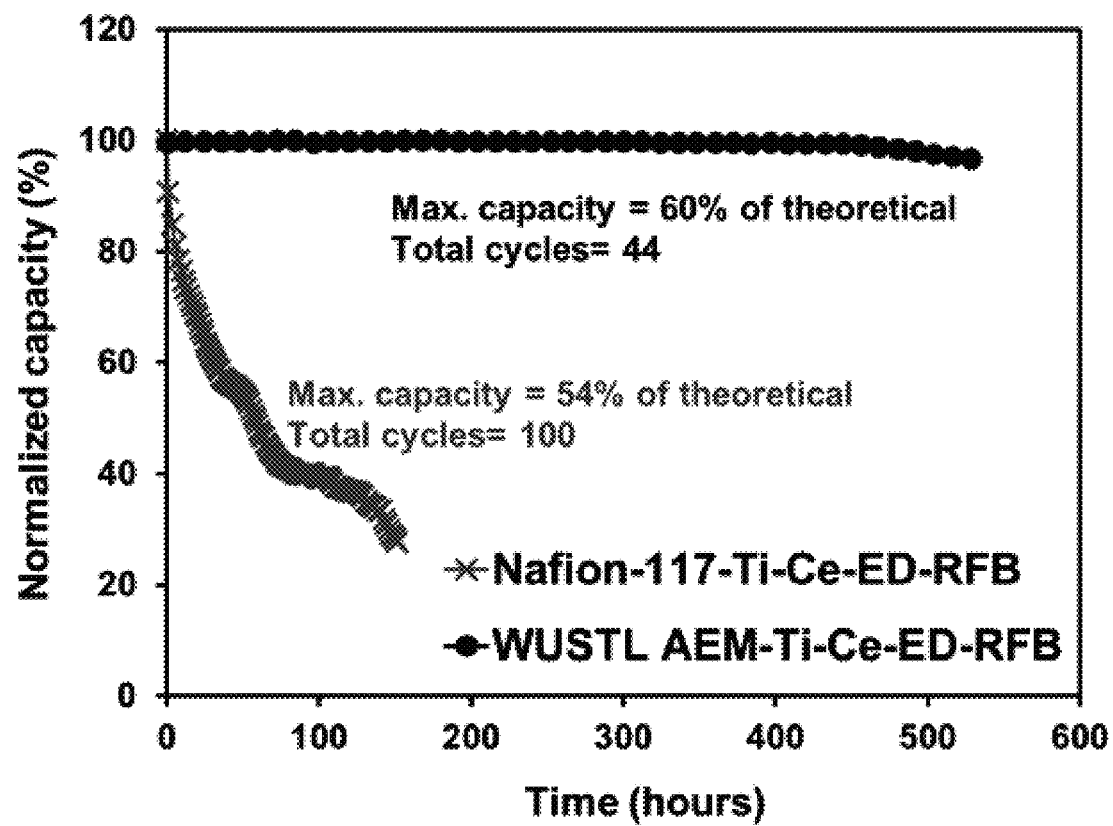
FIG. 8 illustrates a comparison between Ti—Ce redox flow batteries using cation exchange membrane separator (Nafion® 117) and anion exchange membrane separator (Cardo-poly(etherketone)). The Ti—Ce is only electrode-decoupled (i.e., the Ti and Ce ions are hindered from mixing) when using AEM separators. The mixing of Ti and Ce leads to drastic capacity fade as seen in the case of the Nafion® 117 separator.
Figure 9:
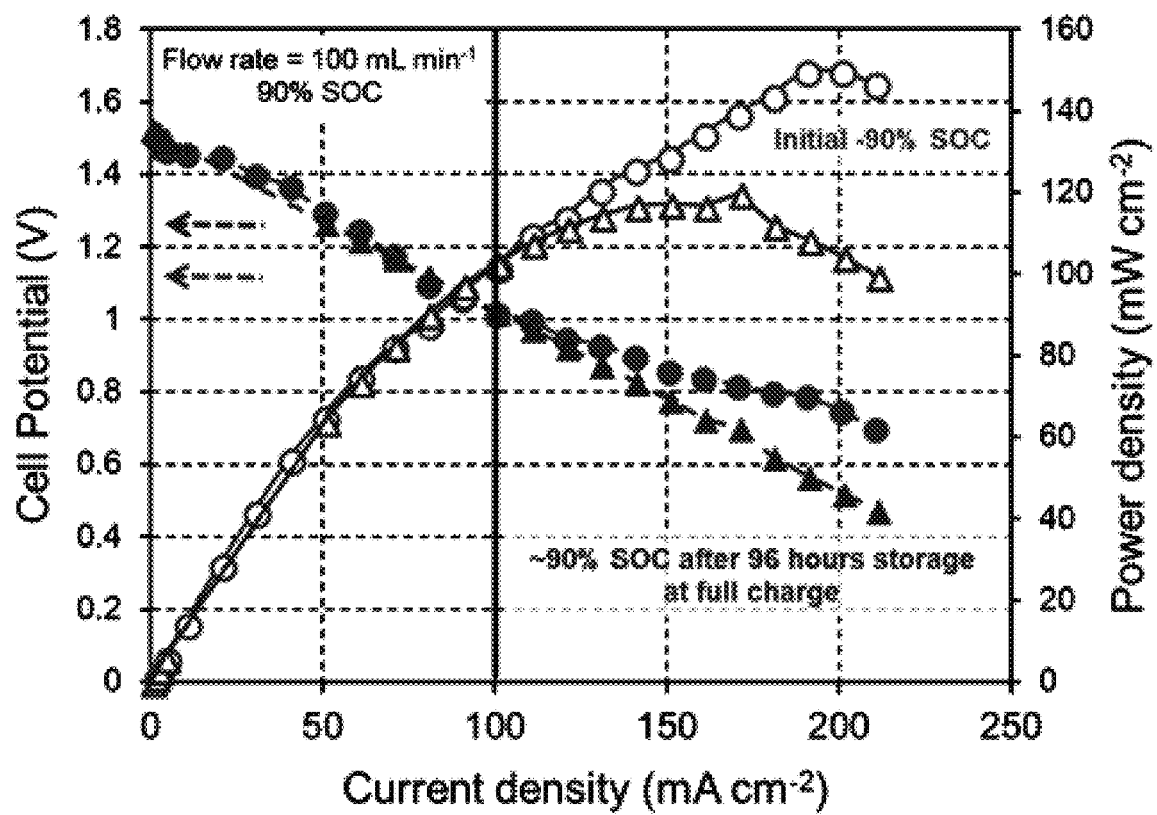
FIG. 9 illustrates the ability of the Ti—Ce ED-RFB to enable long-duration energy storage. A Ti—Ce RFB was charged to 90% of maximum capacity and stored for 96 hours. The subsequent open circuit voltage measurement of the cell and polarization characterization reveal no loss in performance due to storage.

The RFB exhibited no drop in capacity over 25 cycles, as shown in FIGS. 7A and 7B. The coulombic efficiency, which is the ratio of discharge to charge capacity, was between 99.94-100% over 25 cycles. The energy efficiency was lower due to the inevitable overpotential losses during charge and discharge. All these values are essentially unchanged, indicating a remarkably stable RFB. This attribute is potentially of great value for long-term grid-scale storage applications. FIG. 8 illustrates the significant drop in the capacity of the RFB when a cationic ion exchange resin (i.e., Nafion®-117) is used in comparison to an anionic ion exchange resin. FIG. 9 illustrates the long term storage possibilities of the RFB disclosed herein. The battery was charge to 90% of its maximum capacity, and, after 96 hours, no loss of performance was observed. Both the open circuit voltage and polarization characterization of the battery were unchanged after 96 hours.

Thus, disclosed herein is a novel RFB that exhibits remarkable long-term performance stability at less than half the active materials cost of an all-vanadium RFB.

As used herein, an element or step recited in the singular and preceded by the word "a" or "an" should be understood as not excluding plural elements or steps, unless such exclusion is explicitly recited. Furthermore, references to "example embodiment," "exemplary embodiment," or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A redox flow battery (RFB), said battery comprising:
a positive electrolyte comprising colloidal cerium ions, wherein the concentration of the colloidal cerium ions is greater than 1 M,
a negative electrolyte comprising titanium ions,
an ion exchange membrane positioned to extend the entirety between the positive electrolyte and the negative electrolyte, wherein
said membrane is configured to allow the passage of anions and reduce or prevent the flow of cations,
said membrane is configured to restrict and/or prevent the passage of the colloidal cerium ions and/or the titanium ions therethrough,
said membrane is configured to maintain ionic conductivity between the positive electrolyte and the negative electrolyte; and
at least one of the positive electrolyte or the negative electrolyte is an acid comprising sulfuric acid and an acid selected from the group consisting of methane sulfonic acid, perchloric acid, triflic acid, benzene sulfonic acid, trifluoroacetic acid, acetic acid, formic acid, citric acid, phosphoric acid, trifluoromethanesulfonic acid, and combinations thereof.

2. The redox flow battery according to claim 1, wherein at least one anion in the positive electrolyte and the negative electrolyte are the same.

3. The redox flow battery according to claim 1, wherein the acid has a pka of less than 2.0.

4. The redox flow battery according to claim 1, wherein the acid has a pka of less than 0.

5. The redox flow battery according to claim 1, wherein the ion exchange membrane comprises a cardo-poly (ether-ketone).

6. A method for storing electricity, the method comprising:
preparing the redox flow battery according to claim 1.

7. A method for generating an electrical current, the method comprising:
preparing the redox flow battery according to claim 1, and
flowing the positive electrolyte and the negative electrolyte at a flow rate along a surface of the ion exchange membrane thereby generating an electrical current.

8. A method for storing electricity, the method comprising:
preparing a positive electrolyte that comprises colloidal cerium ions, wherein the concentration of the colloidal cerium ions is greater than 1 M;
preparing a negative electrolyte that comprises titanium ions;
placing an ion exchange membrane between the positive electrolyte and the negative electrolyte, wherein
said ion exchange membrane is positioned to extend the entirety between the positive electrolyte and the negative electrolyte,
said membrane is configured to allow the passage of anions and reduce or prevent the flow of cations,
said membrane is configured to restrict and/or prevent the passage of the colloidal cerium ions and/or the titanium ions therethrough,
said membrane is configured to maintain ionic conductivity between the positive electrolyte and the negative electrolyte; and
at least one of the positive electrolyte or the negative electrolyte is an acid comprising sulfuric acid and an acid selected from the group consisting of methane sulfonic acid, perchloric acid, triflic acid, benzene sulfonic acid, trifluoroacetic acid, acetic acid, formic acid, citric acid, phosphoric acid, trifluoromethanesulfonic acid, and combinations thereof.

9. A method for generating an electrical current, the method comprising:
preparing a redox flow battery, and
flowing the positive electrolyte and the negative electrolyte at a flow rate along a surface of the ion exchange membrane thereby generating an electrical current;
wherein the redox flow battery comprises:
a positive electrolyte comprising colloidal cerium ions, wherein the concentration of the colloidal cerium ions is greater than 1 M,
a negative electrolyte comprising titanium ions, an ion exchange membrane positioned to extend the entirety between the positive electrolyte and the negative electrolyte, wherein said membrane is configured to allow the passage of anions and reduce or prevent the flow of cations, said membrane is configured to restrict and/or prevent the passage of the colloidal cerium ions and/or the titanium ions therethrough, said membrane is configured to maintain ionic conductivity between the positive electrolyte and the negative electrolyte; and at least one of the positive electrolyte or the negative electrolyte is an acid comprising sulfuric acid and an acid selected from the group consisting of methane sulfonic acid, perchloric acid, triflic acid, benzene sulfonic acid, trifluoroacetic acid, acetic acid, formic acid, citric acid, phosphoric acid, trifluoromethanesulfonic acid, and combinations thereof.

10. The battery according to claim 1, wherein the colloidal cerium ions comprise $Ce^{3+}$, $Ce^{4+}$ or a mixture of $Ce^{3+}$ and $Ce^{4+}$ and the titanium ions comprise $Ti^{4}+$, $Ti^{3}+$ or a mixture of $Ti^{4}+$ and $Ti^{3+}$.

11. The battery according to claim 1, wherein the battery comprises porous electrodes.

12. The battery according to claim 1, wherein both of the electrolytes further comprise a methanesulfonic acid or a mixture of methanesulfonic acid with perchloric acid.

13. The battery according to claim 1, wherein both of the electrolytes further comprise methanesulfonic acid in a molar concentration from about 1 M to about 4 M.

14. The battery according to claim 9, wherein the membrane comprises quaternized cardo-poly (etherketone).

15. A redox flow battery (RFB), said battery comprising:

a positive electrolyte comprising colloidal cerium ions and methane sulfonic acid, wherein the concentration of the colloidal cerium ions is greater than 1 M, a negative electrolyte comprising titanium ions and methane sulfonic acid, an ion exchange membrane comprising quaternized cardo-poly (etherketone), the membrane positioned to extend the entirety between the positive electrolyte and the negative electrolyte, and porous electrodes comprising carbon felt, wherein said membrane is configured to restrict and/or prevent the passage of the colloidal cerium ions and/or the titanium ions therethrough, said membrane is configured to maintain ionic conductivity between the positive electrolyte and the negative electrolyte, said membrane is configured to allow the passage of anions and reduce or prevent the flow of cations; and at least one of the positive electrolyte or the negative electrolyte is an acid comprising sulfuric acid and an acid selected from the group consisting of methane sulfonic acid, perchloric acid, triflic acid, benzene sulfonic acid, trifluoroacetic acid, acetic acid, formic acid, citric acid, phosphoric acid, trifluoromethanesulfonic acid, and combinations thereof.

* * * * *